(12) United States Patent
Dagar (10) Patent No.: US 9,684,448 B2
(45) Date of Patent: Jun. 20, 2017

(54) DEVICE INPUT SYSTEM AND METHOD FOR VISUALLY IMPAIRED USERS

(71) Applicant: Sumit Dagar, New Delhi (IN)

(72) Inventor: Sumit Dagar, New Delhi (IN)

( * ) Notice: Subject to any disclaimer, the term of this patent is extended or adjusted under 35 U.S.C. 154(b) by 157 days.

(21) Appl. No.: 14/608,579

(22) Filed: Jan. 29, 2015

(65) Prior Publication Data
US 2015/0302774 A1    Oct. 22, 2015

(30) Foreign Application Priority Data

Feb. 11, 2014   (IN) .............................. 481MUM2014

(51) Int. Cl.
| | |
|---|---|
| *G06F 3/0488* | (2013.01) |
| *G06F 3/01* | (2006.01) |
| *G09B 21/00* | (2006.01) |
| *G06F 3/023* | (2006.01) |

(52) U.S. Cl.
CPC ...... *G06F 3/04886* (2013.01); *G06F 3/04883* (2013.01); *G06F 3/016* (2013.01); *G06F 3/0233* (2013.01); *G06F 2203/04809* (2013.01); *G09B 21/005* (2013.01); *G09B 21/007* (2013.01)

(58) Field of Classification Search
CPC ...................... G09B 5/06; G09B 21/00; G09B 21/003–21/008; G06F 3/04886; G06F 3/167; G06F 3/04883; G06F 3/016; G06F 2203/04809; G06F 1/1671
See application file for complete search history.

(56) References Cited

U.S. PATENT DOCUMENTS

| | | | | |
|---|---|---|---|---|
| 2002/0054030 | A1* | 5/2002 | Murphy | G06F 1/1626 345/173 |
| 2002/0149566 | A1* | 10/2002 | Sarkissian | G06F 3/0202 345/168 |
| 2008/0055255 | A1* | 3/2008 | Griffin | G06F 1/1626 345/173 |
| 2010/0052951 | A1* | 3/2010 | Burrell, IV | H03M 11/06 341/23 |
| 2010/0127988 | A1* | 5/2010 | Park | G06F 3/018 345/168 |

(Continued)

OTHER PUBLICATIONS

Paisios et al., "Mobile Brailler: Making Touch-Screen Typing Accessible to Visually Impaired Users," New York University, Jun. 2012, 4 pages.

*Primary Examiner* — Larry Sternbane
*Assistant Examiner* — Darlene M Ritchie
(74) *Attorney, Agent, or Firm* — Orrick, Herrington & Sutcliffe, LLP (57) ABSTRACT

A device and user interface for visually impaired users for, and methods for manufacturing and using same. One aspect includes a method of providing a device user interface for visually impaired users and receiving touch-based user input via the interface, the method including: replacing automatically a default device user interface with the device user interface for visually impaired users; presenting via a touch screen of the user device a first menu item comprising menu text; and presenting via a speaker of the user device a first audio message corresponding to the first menu item text. Another aspect includes a user device for visually impaired users comprising a touch screen configured to receive touch input from a user and present a touch-input interface for Braille input comprising a plurality of input regions defined by and separated by input region boundaries.

16 Claims, 9 Drawing Sheets

(56) References Cited

U.S. PATENT DOCUMENTS

| | | | | |
|---|---|---|---|---|
| 2010/0271241 A1* | 10/2010 | Weller | G06F 3/0219 | 341/22 |
| 2011/0111375 A1* | 5/2011 | Luu | G09B 21/004 | 434/114 |
| 2011/0113328 A1* | 5/2011 | Marzke | G06F 3/0488 | 715/702 |
| 2011/0143321 A1* | 6/2011 | Tran | G09B 21/007 | 434/114 |
| 2011/0205160 A1* | 8/2011 | Song | G06F 3/0236 | 345/168 |
| 2012/0007809 A1* | 1/2012 | Mahalingam | G09B 21/003 | 345/173 |
| 2012/0218193 A1* | 8/2012 | Weber | G06F 1/1626 | 345/173 |
| 2012/0327001 A1* | 12/2012 | Higginson | G06F 3/04886 | 345/173 |
| 2013/0135238 A1* | 5/2013 | Naccache | G09B 21/005 | 345/173 |
| 2013/0332827 A1* | 12/2013 | Smith | G06F 3/016 | 715/702 |
| 2014/0181722 A1* | 6/2014 | Kim | G06F 3/0233 | 715/773 |
| 2014/0244412 A1* | 8/2014 | Davis | G06Q 20/204 | 705/17 |
| 2014/0281950 A1* | 9/2014 | White | G06F 3/0488 | 715/269 |
| 2014/0292706 A1* | 10/2014 | Hunt | G06F 3/016 | 345/174 |
| 2014/0310610 A1* | 10/2014 | Ricci | H04W 48/04 | 715/744 |
| 2015/0121285 A1* | 4/2015 | Eleftheriou | G06F 3/04842 | 715/773 |
| 2015/0154003 A1* | 6/2015 | Kim | G06F 3/167 | 715/729 |

* cited by examiner

Swipe Right to unlock phone.

When phone is activated, you can swipe from left to right to unlock phone. For best use, switch to screen lock : none in your android settings.

Swipe Up/Down to scroll up/down.

On any item, you can swipe to scroll. You can also swipe and hold to scroll faster. For example, when browsing contacts, swipe to go one by one, swipe and hold to go alphabet by alphabet.

Tap to enter/Okay.

On any item, you can tap to enter or move ahead. For example, Tap on a message content will take you to typing pad for typing reply.

Swipe Left to go back/cancel.

You can swipe left at any time cancel an action or to go back. For example, on incoming call, swipe left to cancel.
Note: this action does not work on typing pads.

Tap and Hold to get extra options.

You can tap and hold at any time to get options related to entry on screen. For example, when on message content, tap and hold to get forward/call options.

Two finger Tap and Hold to get information.

You can tap with two finger and hold at any time to get information related to entry on screen. For example, when in home list, this action tells battery remaining.

Swipe down with two finger to repeat.

You can swipe down with two fingers to repeat the content on screen. For example, when typing, swipe down two fingers to repeat the typed content.

*Fig.7*

Move your finger around to listen number/symbol.

This is standard 12-key numpad, move your finger around to hear number/symbol under your finger.

Lift your finger to type the number/symbol.

When you hear the intended number, lift your finger. The number will be spoken again and will be typed.

Lift and tap multiple times to enter alphabets.

Alphabets are arranged on numbers. After lifting your finger to hear intended number, you can tap (anywhere) on screen to hear alpabets on number. When you stop tapping, alphabet is typed.

Two finger swipe left and hold to delete.

You can use two finger (placed at a distance) to swipe from right towards left of screen and hold them there. This will delete last typed character. Longer hold will delete all content.

Two finger swipe right and hold to give space.

You can use two finger (placed at a distance) to swipe from left towards right of screen and hold them there. This will add a space after last typed character. Longer hold will add enter.

Two finger Swipe down to hear content.

You can swipe down with two fingers to repeat the content on screen. For example, when typing, swipe down two fingers to repeat the typed content.

Tap and hold to get options/exit.

You can tap and hold at any time to get options related to typed content. This gesture is also the way for exiting typing screen.

*Fig. 8*

Move your finger around to pin tones.

The phone screen is divided into six big boxes, these are for Braille pin 1 to 6. Touch the respective boxes to type the pins. You can touch these boxes in any order.

Lift your finger when all required pins are typed.

When you lift your finger, the typed character is spoken out.

Lift and tap quickly to type disconnected pins.

In case disconnected pins need to be typed, lift finger and tap quickly on the intended boxes. You can also use multiple fingers.

Two finger swipe left and hold to delete.

You can use two finger (placed at a distance) to swipe from right towards left of screen and hold them there. This will delete last typed character. Longer hold will delete all content.

Two finger swipe right and hold to give space.

You can use two finger (placed at a distance) to swipe from left towards right of screen and hold them there. This will add a space after last typed character. Longer hold will add enter.

Two finger Swipe down to hear content.

You can swipe down with two fingers to repeat the content on screen. For example, when typing, swipe down two fingers to repeat the typed content.

Tap and hold to get options/exit.

You can tap and hold at any time to get options related to typed content. This gesture is also the way for exiting typing screen.

*Fig.9*

DEVICE INPUT SYSTEM AND METHOD FOR VISUALLY IMPAIRED USERS

CROSS-REFERENCE TO RELATED APPLICATIONS

This application claims the benefit of Indian Patent Application No. 481/MUM/2014 titled "Tactile coupling for vision-independent operation of electronic devices" filed on 11 Feb. 2014. This application is hereby incorporated herein by reference in its entirety and for all purposes.

BACKGROUND

Conventional electronic devices such as tablet computers and smart phones provide robust and user-friendly touch interfaces for users with normal sight. However, such devices are typically difficult, if not impossible to use by visually impaired users. In addition to not being able to see text and other icons that are present on the screen of such devices, input via touch-keyboards, or the like, that are presented on a smooth touch-screen of the device also makes text input difficult or impossible for such vision impaired users.

In view of the foregoing, a need exists for an improved device and interface for visually impaired users in an effort to overcome the aforementioned obstacles and deficiencies of conventional passenger information systems.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available electronic devices are deficient, a device and interface for visually impaired users that allows for conventional devices to be used by vision-impaired users can prove desirable and provide a basis for a wide range of applications for vision-impaired users of conventional electronic devices. This result can be achieved, according to one embodiment disclosed herein, by a user device 100 as illustrated in FIGS. 1A-D.

Turning to FIGS. 1A-D, the user device 100 is shown as comprising a touch-screen 110 that defines touch-input interface 115 having a plurality of input regions 116 (labeled A-F) and a portal region P. As described herein the touch-input interface 115 can be used to input Braille using various methods including the six-dot system illustrated in FIGS. 4A and 4B.

Figure 1A:
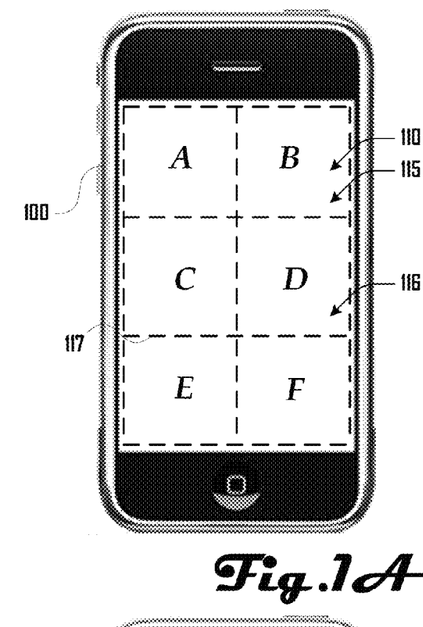
FIGS. 1A-D illustrate example embodiments of a touch-input interface on a user device, where the touch-input interface comprises a plurality of input regions.

For example, FIG. 1A illustrates an embodiment of a touch-input interface 115 having six input regions A-F arraigned in a 2×3 rectangle, with respective input regions A-F abutting along their boundaries 117.

Figure 1B:
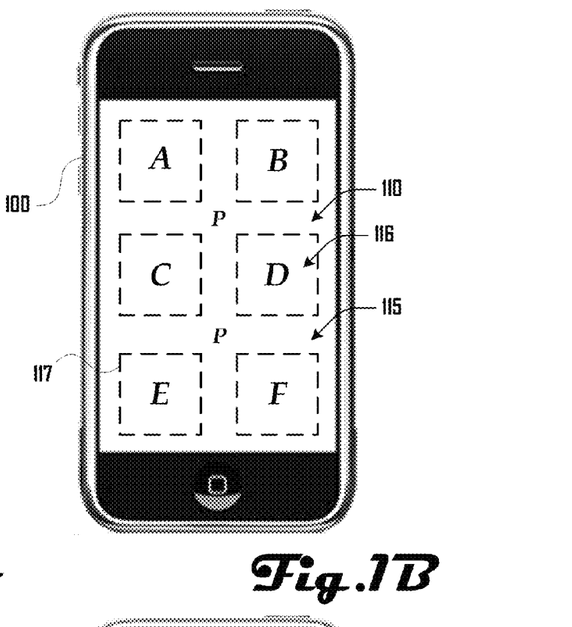

FIG. 1B illustrates another embodiment of a touch-input interface 115 having six input regions arraigned in two columns having three rows. Additionally, the touch-input interface 115 shown in FIG. 1B also comprises a portal region P, which surrounds and separates each of the input regions A-F.

Figure 1C:
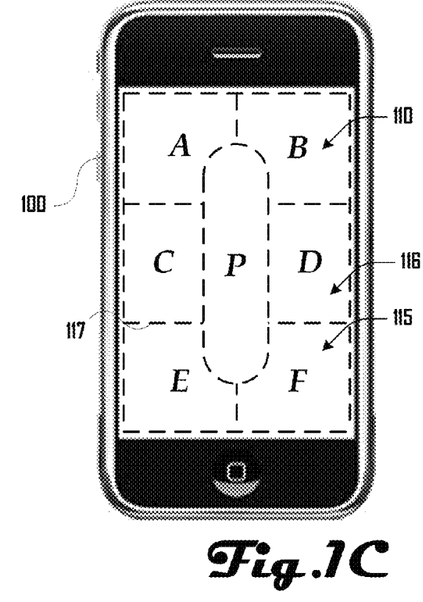

FIG. 1C illustrates a further embodiment of a touch-input interface 115 having six input regions A-F arraigned in a 2×3 rectangle, with respective input regions A-F abutting along their boundaries 117, and an elongated centrally-located portal region P that abuts a portion of each of the six input regions A-F.

Figure 1D:
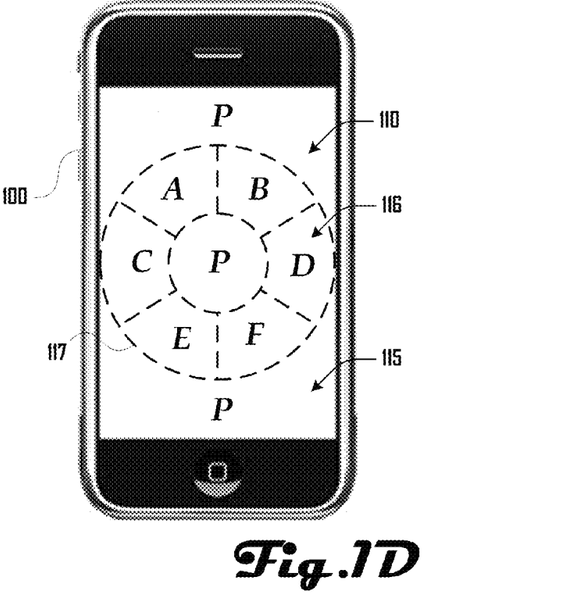

FIG. 1D illustrates yet another embodiment of a touch-input interface 115 having six input region wedges A-F that collectively have a circular outer perimeter and that collectively surround a circular portal region P. Portal regions P are also above and below the outer perimeter of the input region wedges A-F.

The example embodiments of touch interfaces 115 shown in FIGS. 1A-D should not be construed to limit the shape of the interfaces 115 including portal regions P and regions 116. Such regions, 116, P can be any suitable size and/or shape in further embodiments, including circles, triangles, an irregular shape, or the like.

Figure 4A:
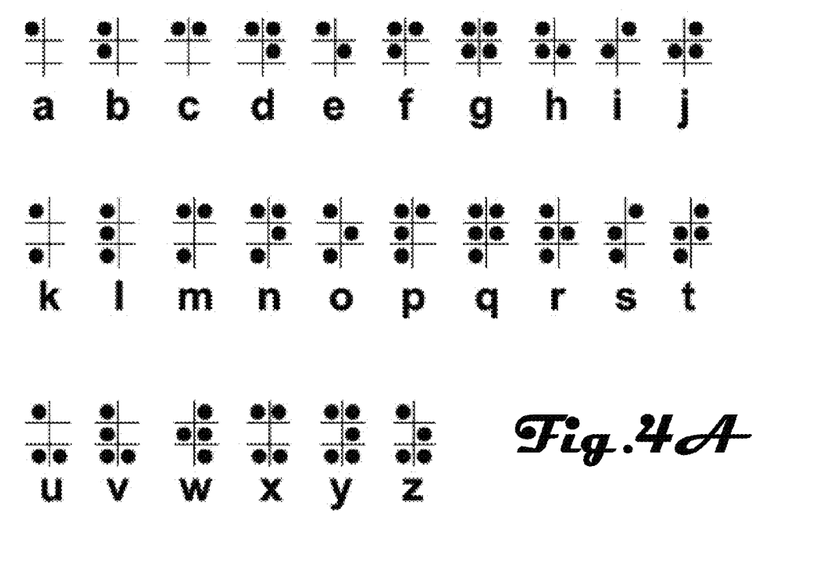
FIGS. 4A and 4B illustrate codes for six-dot Braille input that can be used with the touch-input interfaces shown in FIGS. 1A-D.
Figure 4B:
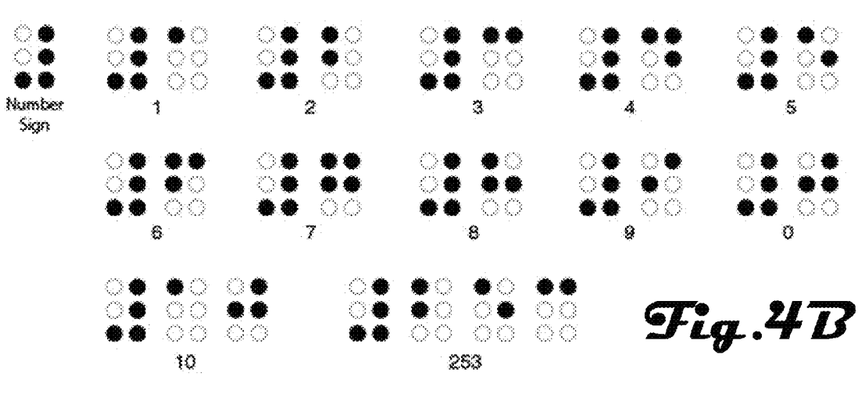

In accordance with various embodiments, the touch-input interface 115 can be used for input of six-dot Braille characters as illustrated in FIGS. 4A and 4B. For example, a user can contact the touch screen with a finger within any of the input regions 116; remove the finger from the touch screen; and again contact the touch screen with a finger within any of the input regions 116 to select inputs that correspond to a portion of a six-dot Braille character. In various embodiments, touching a given input region 116 can trigger a sound, haptic feedback and/or change the color, pattern or other visual aspect of the display of the input region 116.

Additionally, in further embodiments, absence of further input region selections can trigger the currently selected set of input regions 116 as the desired six-dot character. For example, referring to FIG. 1A and FIG. 4A, if a user touched input region A, and then did not touch any further input regions 116 within a set time period, then the character "a" would be the output. However, if a user touched input region A, then touched input region D, and then did not touch any further input regions 116 within a set time period, then the character "e" would be the output. In various embodiments, the order of the touched regions does not change the output character. In further embodiments, re-touching a selected input region 116 can de-select that input region 116, or re-touching a selected input region 116 may have no effect on the input region 116 and it may remain selected. Additionally, in some embodiments, when an output character is generated, a sound can be produced (e.g., the character can be recited), haptic feedback can be generated (e.g., vibration) and/or the character can be displayed.

Figure 2A:
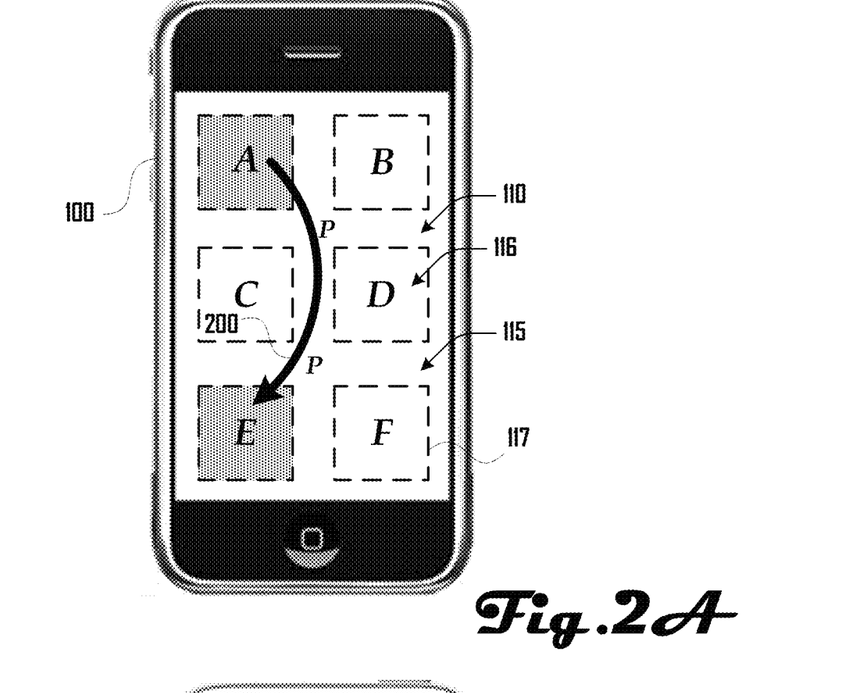
FIGS. 2A and 2B illustrate a method of inputting characters via six-dot Braille using the touch-input interface of FIGS. 1B and 1C respectively.

Additionally, in some embodiments, a user can maintain contact with the touch screen 110 while selecting a plurality of input regions 116 in the touch-input interface 115. For example, in some embodiments, a user can touch a first input region 116 with a finger, and drag the finger on the screen to one or more additional input regions 116. For example, referring to the touch-track 200 shown in FIG. 2A, if a user first touched input region A with a finger and then dragged the finger through the portal region P and into input region E, and then did not touch any further input regions 116 and/or removed the finger from the touch screen within a set time period, then the character "k" would be the output as indicated in FIG. 4A.

Figure 2B:
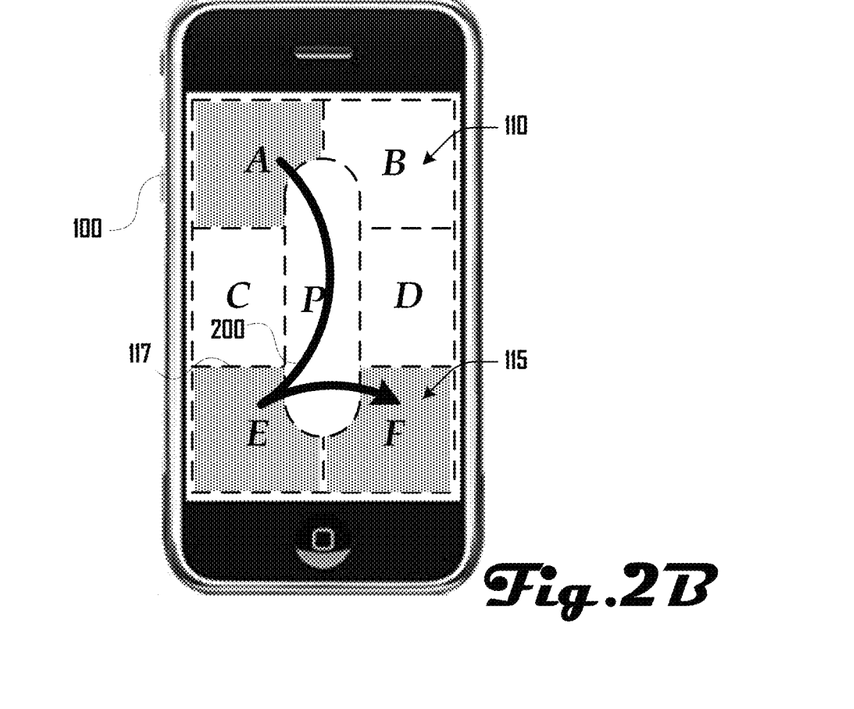

In another example, and referring to touch-track 200 shown in FIG. 2B, if a user first touched input region A with a finger and then dragged the finger through the portal region P and into input region E, then dragged the finger through the portal region P and into input region F, and then did not touch any further input regions 116 and/or removed the finger from the touch screen within a set time period, then the character "u" would be the output as indicated in FIG. 4A. As discussed above, in some embodiments, when an output character is generated, a sound can be produced (e.g., the character can be recited), haptic feedback can be generated and/or the character can be displayed.

Accordingly, portal region(s) P can provide a portion of the input interface 115 where input regions 116 are not selected, which can provide a buffer for selections of input regions 116 and can provide an area where a user can drag a finger when selecting input regions that are not directly adjacent. In the examples shown in FIGS. 2A and 2B, the portal region P allows a user to maintain contact with the touch screen 110 when selecting non-adjacent input regions A and E and avoid selecting region C.

In various embodiments, a user can use any suitable combination of swipe-input and input that includes lifting a finger off the screen 110 while inputting a given character. Alternatively, in some embodiments, a user can be required to use swipe-input. For example, in such embodiments, lifting a finger off the screen 110 after selecting one or more input regions 116 via swipe-input can trigger output of a character based on the selected one or more input regions 116. Additionally, while various embodiments described herein relate to Braille six-dot/six-pin input methods, further embodiments can include any suitable input method including eight-dot/eight-pin input, grade I, II or III Braille, including Braille in any suitable language, or the like.

As described in more detail herein, an input interface 115 can be provided as a portion of a device interface for visually impaired users that substantially replaces a default device interface. However, in further embodiments, an input interface 115 can be provided as an alternative input method that is part of a default device interface. For example, smartphones and other user devices 100 can allow a user to download and/or select alternative keyboards or input methods (e.g., a qwerty touch keyboard, a qwertz touch keyboard, a Dvorak touch keyboard, a Maltraon touch keyboard, voice typing, or the like). Accordingly, an input interface 115 as described herein can be such an alternative input method.

Figure 3A:
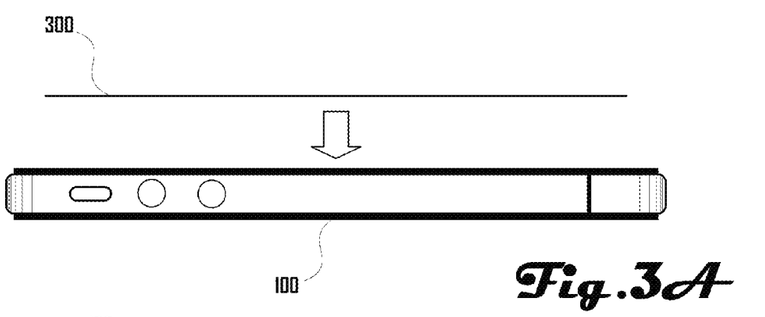
FIG. 3A illustrates how an input guide can be coupled to the touch screen of the user device of FIGS. 1A-D
Figure 3B:
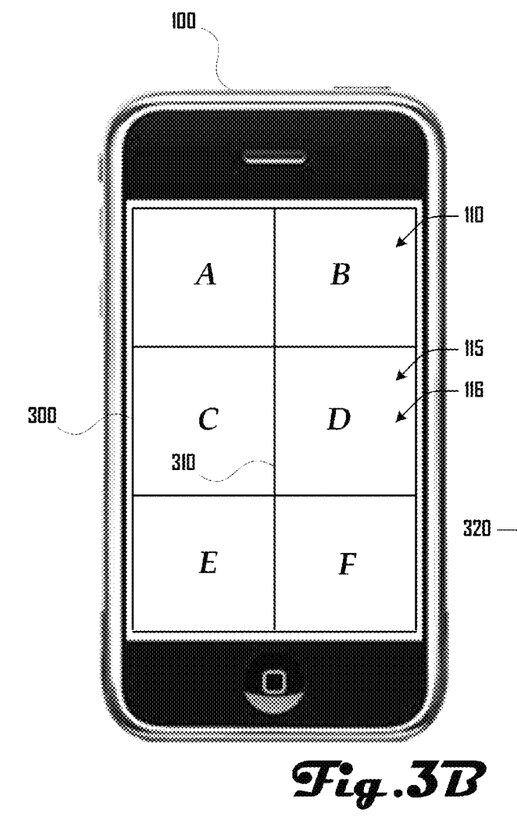
FIG. 3B illustrates an example embodiment of an input guide coupled over the touch-input interface of the user device of FIG. 1A.
Figure 3C:
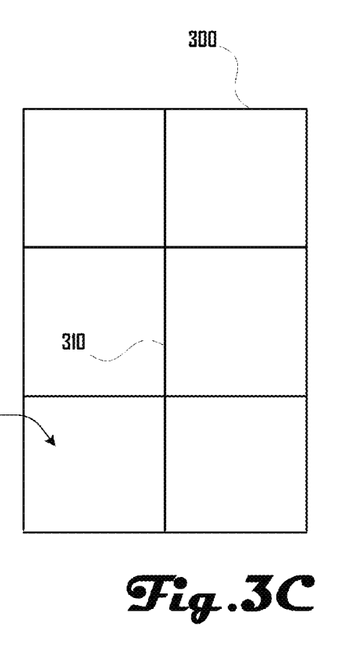
FIG. 3C illustrates the input guide shown in FIG. 3B.

Turning to FIGS. 3A-C, in various embodiments, it can be desirable to couple an interface guide 300 to the touch screen 110 of the user device 100, which corresponds to the touch-input interface 115, and input regions 116 thereof. For example, as illustrated in FIG. 3C, the interface guide 300 can comprise a plurality of raised portions 310 and flat portions 320 that respectively correspond to the input regions 116 and the boundaries 117 between input regions. In other words, the interface guide 300 can provide a tactile indication as to whether the user is touching a boundary 117 of an input region 116 or portal region P and/or touching an input region 116 or portal region P.

Although the input guide 300 illustrated in FIGS. 3B and 3C can be configured to correspond to the touch-input interface 115 shown in FIG. 1A, the input guide 300 can be configured to correspond to the touch-input interfaces 115 shown in FIGS. 1B-D and any other desirable touch-input interface 115.

Additionally, although a raised portion 310 and flat portion 320 are shown as one example, this should not be construed to be limiting on the many other embodiments that are within the scope and spirit of the present invention. For example, in one embodiment, the portions 310 that correspond to boundaries 117 of an input region 116 and/or portal region P can be a slot or depression in the input guide 300 instead of a raised portion. In further embodiments, any of the portions 310, 320 can be different textures so as to provide a suitable indication of different areas. Additionally, in some embodiments, the input guide 300 can include physical indicators such as letters, numbers, symbols, or the like.

In various embodiments, it can be beneficial for the input guide 300 to be transparent and configured to accommodate touch-input via the touch screen 110 of the user device 100, even when the input guide 300 is coupled to the user device 100. In other words, it can be beneficial for the input guide to 300 allow a user to still view content presented on the touch screen 110 and also not substantially interfere with touch input via the touch screen 110.

As illustrated in FIG. 3A, in various embodiments, the input guide 300 can be a thin and substantially planar sheet that is configured to be coupled over the touch screen 110 of the user device 100. The input guide 300 can comprise any suitable material, including vinyl, polyurethane, glass, or the like. The input guide can 300 couple with a touch screen 110 with or without an adhesive.

Additionally, although the user device 100 is shown as a smart phone in FIGS. 1A-D, 2A, 2B, 3A, and 3B, in further embodiments, the user device can comprise any suitable device and/or screen. For example, in further embodiments, the user device 100 can include a tablet computer, personal data assistant, gaming device, laptop computer, desktop computer, kiosk device, smartwatch, or the like. In further embodiments, a touch-input interface 115 and/or input guide 300 can associated with a touch screen of any suitable size, which may or may not be directly associated with a computing device.

In various embodiments, it can be desirable for the user device 100 to be a conventional-mass produced user device 100 (e.g., an i-phone, or the like). Instead of requiring a specialized device that is configured for visually impaired users, a conventional device can simply be retrofitted with an input guide 300 and an app can be installed on the device that provides a device interface for visually impaired users. This can be beneficial because the user can use any commonly available device and service provider, which can allow the user to easily upgrade their device, obtain service for their device, and even allow sighted users to use the device because the default interface of the device is likely commonly known. Accordingly, in various embodiments, the user device 100 does not comprise specialized hardware or software for visually impaired users (not including from any such default software or hardware present on the device that might be construed to be for visually impaired users) aside from the input guide 300 and a software (or app) for a device interface for visually impaired users.

Figure 5:
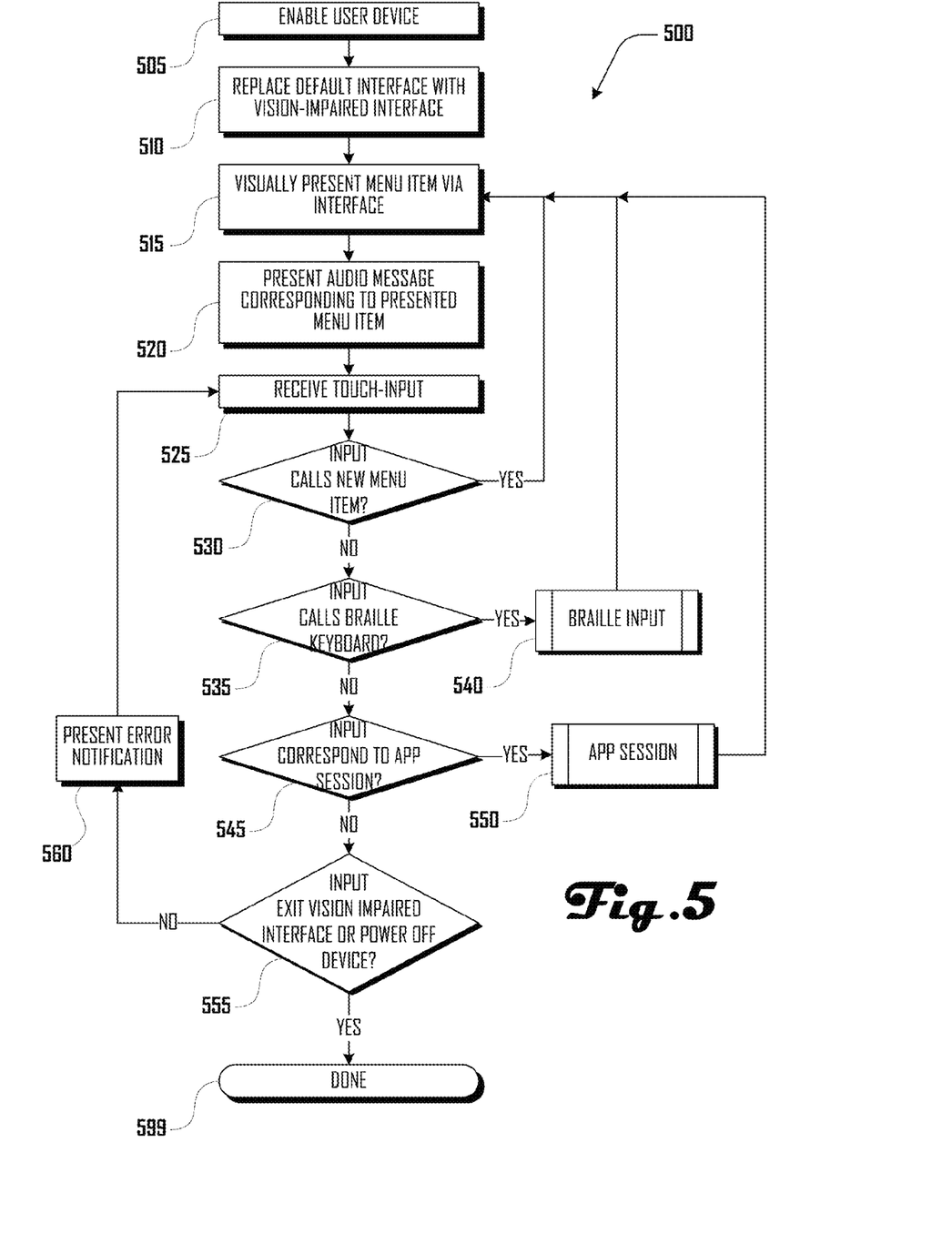
FIG. 5 illustrates a method for providing a device interface for visually impaired users in accordance with an embodiment.

For example, FIG. 5 illustrates a method 500 for providing a device interface for visually impaired users. The method 500 begins, in block 505, where the user device 100 is enabled, which can include turning on the user device 100 or waking the device from a sleep or hibernation mode, or the like.

In block 510, the default interface of the user device 100 is replaced with a device interface for visually impaired users as described herein. For example, a conventional user interface can comprise a home screen with a plurality of widgets and/or application (app) icons that can be selected by a user or otherwise interacted with. Such a default interface may not be suitable for a vision-impaired user, who may not be able to see or easily see the icons and text on the screen. Accordingly, the device interface for visually impaired users can be presented in place of the default user interface as described herein. In various embodiments, such a replacement can occur automatically, without user interaction.

In block 515 a menu item is visually presented by the interface, and in block 520, an audio message is presented that corresponds to the visually presented menu item. In various embodiments, a menu item can simply be text that indicates what the menu item is or provides instructions related to the menu item. For example, referring FIG. 6B, menu item 670 shown on the touch screen 110 of the user device 100 can simply be text that reads "CREATE NEW TEXT NOTE," and in such an embodiment an audio message corresponding to this menu item can be a voice that says "Create new text note." Having a large text menu visually displayed and also presented via audio can be beneficial because some users may have no sight, and may therefore need to rely on audio menu indicators alone. Alternatively, some users can have limited sight and may be able to perceive menu item presentations, but only if they are in large text. Additionally, presentation of text on a menu item can also be readable by a person assisting a vision-impaired user.

Figure 7:
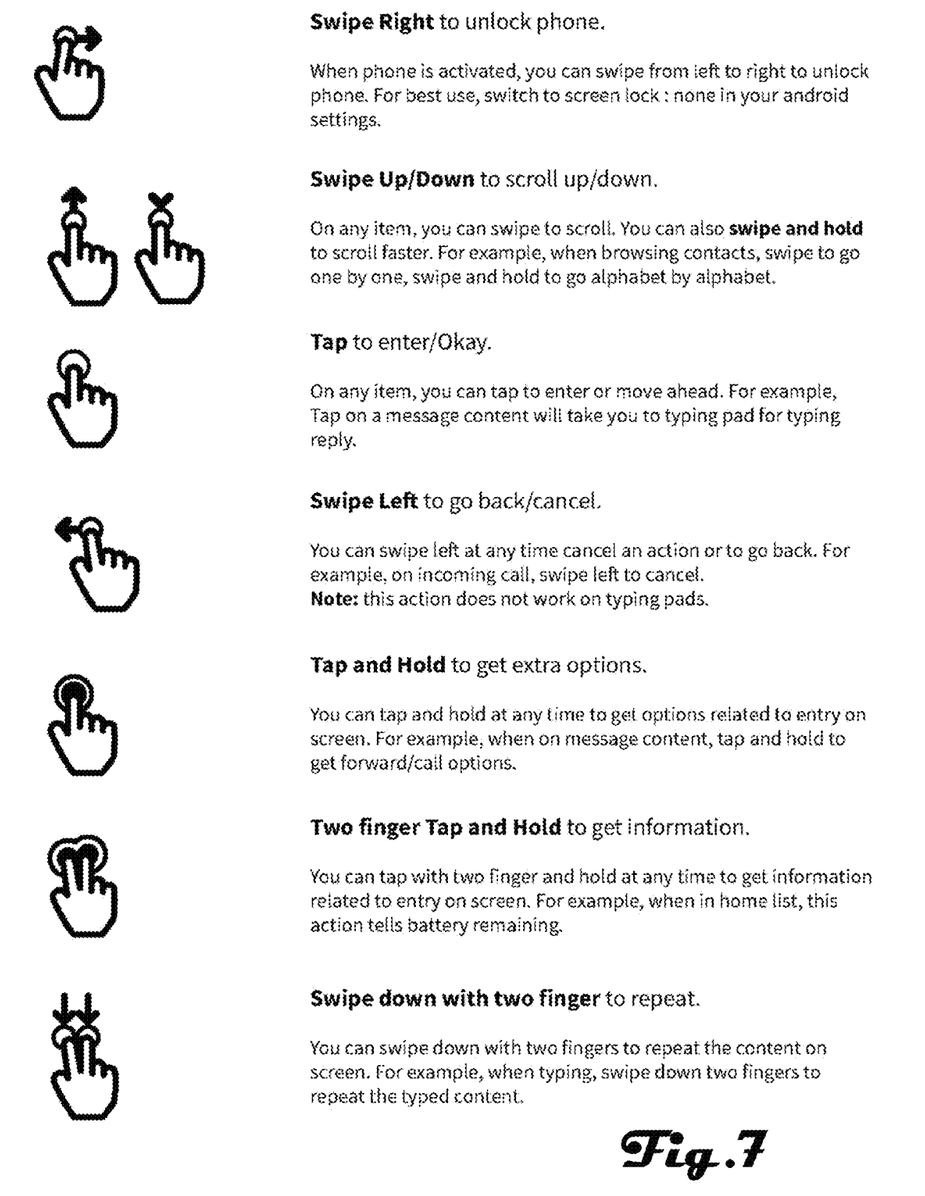
FIGS. 7-9 illustrate example touch gestures for a device interface in accordance with various embodiments.
Figure 8:
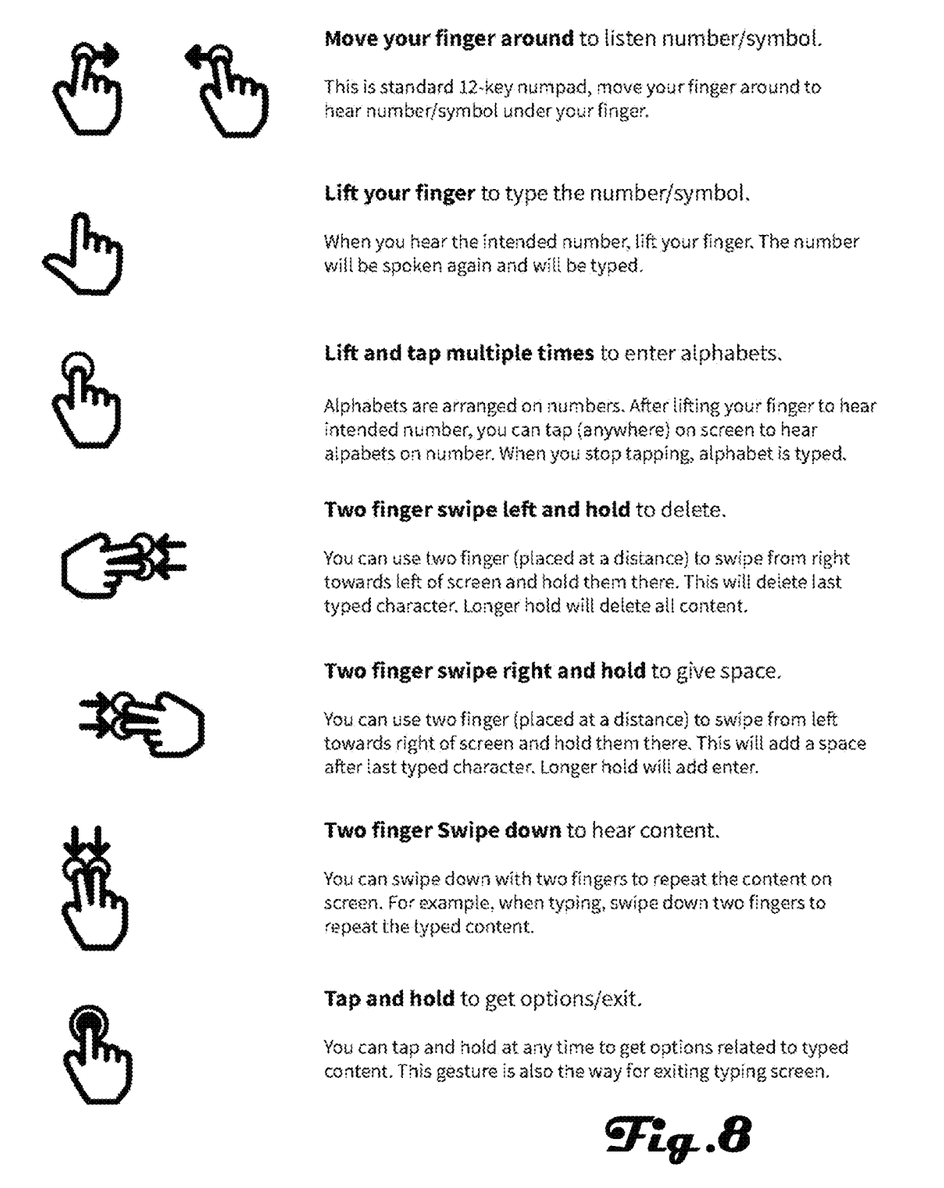
Figure 9:
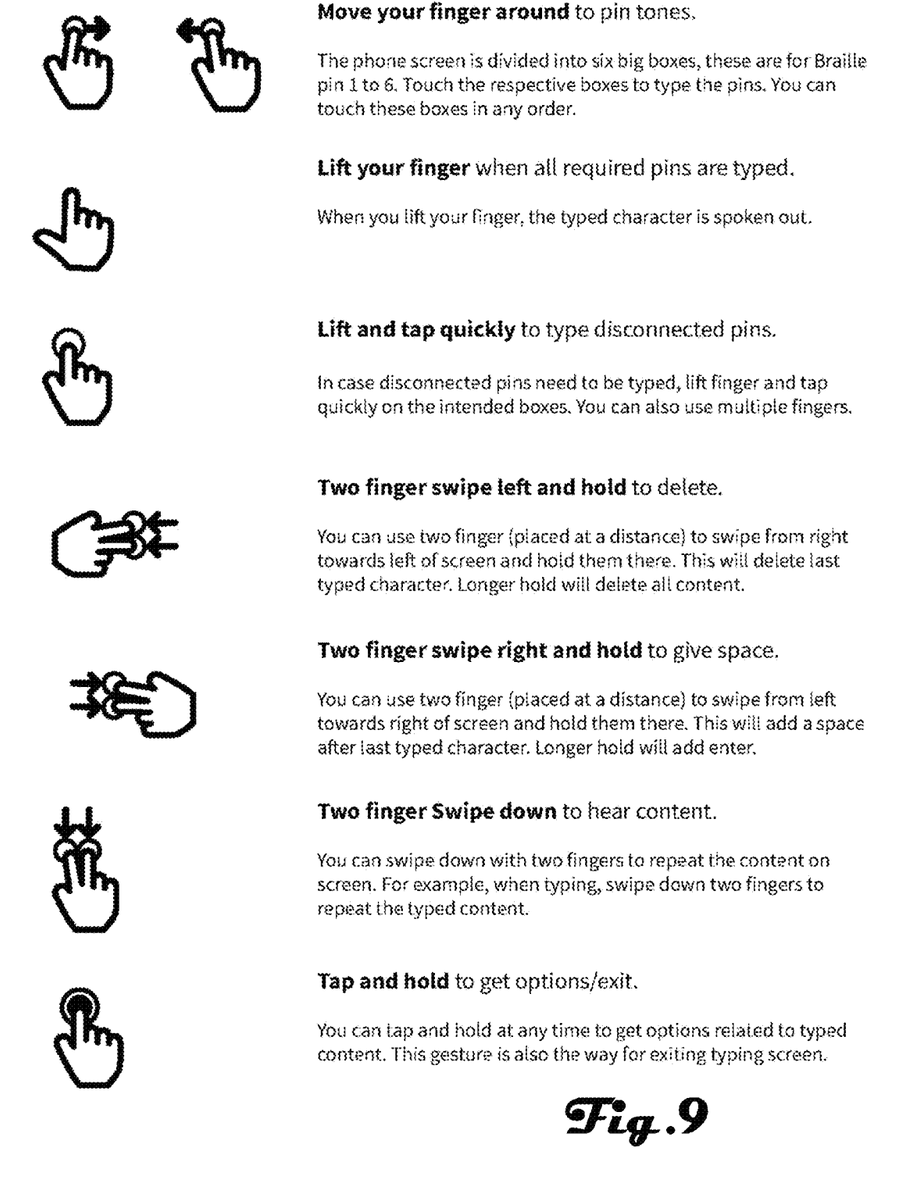

Returning to FIG. 5, the method 500 continues, to block 525, where touch input is received via the touch screen 110. Touch input can be various touches, swipes, holds, or the like, that are generated with one or more finger or other suitable input stylus. For example, FIGS. 7-9 illustrate various touch input commands in accordance with one embodiment.

Figures 6A, 6B:
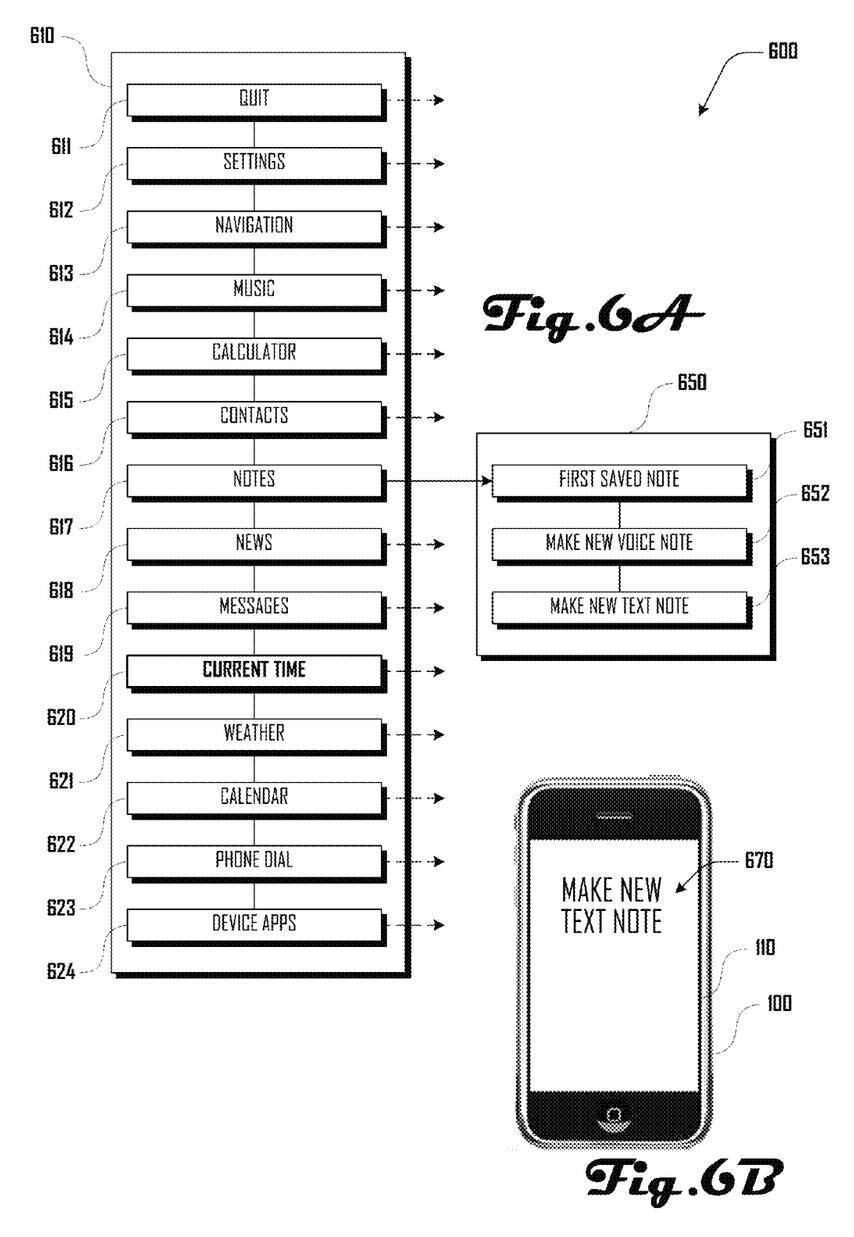
FIG. 6A illustrates an example representation of a menu system of an interface for visually impaired users, in accordance with an embodiment.
FIG. 6B illustrates visual presentation of a menu item in accordance with an embodiment.

In block 530 a determination is made whether the input calls a new menu item, and if so, the method 500 cycles back to block 515 where the new menu item is presented visually, and then continues to block 520 where an audio message associated with the new menu item is also presented. For example, as illustrated in FIG. 6A, the device interface for visually impaired users can comprise a menu system 600 that can be accessed via various touch gestures. Presume that current time menu 620 is a default menu item or that a user otherwise begins on this menu item 620. In such an example, the screen 110 would display the current time and an audio voice would speak the current time.

If the user desired to create a new text note, then the user could move to the notes menu item 617 by first swiping up on the screen 110 to access the messages menu item 619. Text related to the messages menu item 619 can be displayed and an audio message related to the messages menu item 619 would be presented. The user could again swipe up to access the news menu item 618, and then swipe up again to access the notes menu item 617. In various embodiments, the screen 110 would only display text associated with a single menu item at a time and present an audio message associated with one menu item at a time.

When presented with the notes menu item 617, the user can tap the screen 110 to access sub-menu 650 that corresponds to notes and creation of notes. The first menu presented can be a first saved note menu item 651, and, in some embodiments, the screen 110 would only display text and present audio related to this note menu item 651. To reach the new text note menu item 653, the user can swipe down on the screen to first reach the new voice note menu item 652, and then swipe down again to reach the new text note menu item 653, which can present a menu item 670 as illustrated in FIG. 6B.

As shown in FIG. 6A, the example menu structure can comprise a primary menu set 610 having a plurality of menu items 611-624. One or more sub-menu can be associated with each of the menu items 611-624, but for purposes of clarity, only sub-menu 650 associated with the notes menu item 617 is shown here. The present example menu structure 600 should not be construed to limit the many possible structures that are within the scope and spirit of the present invention.

Returning to FIG. 5, if a given touch input does not call a new menu item, then the method 500 continues to decision block 535, where a determination is made whether the input calls a Braille keyboard. If the given input does call a Braille keyboard, then a Braille input session begins in block 540, and when it is over, the method 500 cycles back to block 515 where a menu item is presented, which may or may not be a new menu item.

In various embodiments, the Braille keyboard can comprise a touch-input interface 115 having a plurality of input regions 116 as shown in FIGS. 1A-D, 2A and 2B, or any other suitable interface. As described herein text characters can be input one-at-a-time via the touch-input interface 115 via six-dot input as shown in FIGS. 4A and 4B during a Braille input session. The resulting characters can be stored and used in various applications, in relation to a menu item, or the like. For example, in the example shown in FIGS. 6A and 6B, a user can input and store a text note.

Returning to FIG. 5, if a determination is made in block 535 that the input does not call a Braille keyboard, then the method 500 continues to decision block 545, where a determination is made whether the input corresponds to an app session. If so, then the method 500 continues to block 550, where an app session occurs, and when it is over, the method 500 cycles back to block 515 where a menu item is presented, which may or may not be a new menu item.

For example, in various embodiments, a user can access conventional apps on the device, which may or may not suspend the presentation of the interface for visually impaired users as discussed herein. For example, in one embodiment, the user can navigate to the device apps menu item 624 as shown in FIG. 6A, and access a sub-menu (not shown) that comprises menu items corresponding to apps that are installed on the device (not shown). By selecting a menu item corresponding to a given app, the app can then launch in a conventional way, including in a way that may support visually impaired users. Closing or otherwise leaving the app can then cause the device to return to the interface for visually impaired users, and such a return can occur without direct user selection, or by default, in accordance with some embodiments.

Returning to FIG. 5, if a determination is made in block 545 that the input dons not call an app session, then the method 500 continues to decision block 555, where a determination is made whether the input selects an exit of the interface for visually impaired users or a power-off of the user device 100. If so, then the method 500 is done in block 599. However, if not, then an error notification is presented in block 560 and the interface for visually impaired users waits for further input to occur in block 525.

For example, if a user provides an invalid touch gesture, a gesture that is not applicable at a given menu item, or if a touch gesture is ambiguous, the interface for visually impaired users can present an audio, visual and/or haptic indication of an error, which can allow the user to then provide a new touch input and continue interacting with the interface.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A user device for visually impaired users, the user device comprising:
   a touch screen configured to:
      receive touch input from a user; and
      present a touch-input interface for Braille input comprising a plurality of input regions defined by and separated by input region boundaries, each input region abutting at adjacent input region boundaries and being separated by a centrally-located portal region that is elongated and abuts at least a portion of each input region,
   wherein the plurality of input regions are configured for Braille input and arranged in rows and columns, and
   wherein the centrally-located portal region provides an area for dragging a finger as a buffer for selection of the plurality of input regions, such that the finger maintains contact with the touch screen and passes through the portal region while inputting a Braille character by selecting two or more of the plurality of input regions, and wherein contact is maintained until lifting the finger off the touch screen to trigger output of the Braille character based on the selected two or more of the plurality of input regions.

2. The user device of claim 1, wherein said plurality of input regions are configured for six-dot Braille input, and wherein said six input regions comprise six rectangular input regions in a 2×3 arrangement of rows and columns.

3. The user device of claim 1, wherein said plurality of input regions are configured for six-dot Braille input and in a 2×3 arrangement rows and columns.

4. The user device of claim 1, wherein said plurality of input regions are configured for six-dot Braille input and collectively and completely surround the centrally-located portal region.

5. The user device of claim 1, further comprising an input guide coupled over a portion of the touch screen having first physical portions corresponding to the location of the input regions and second physical portions corresponding to the location of the input region boundaries, and wherein the first and second physical portions have different physical characteristics.

6. The user device of claim 5, wherein the input guide is a planar sheet of transparent material.

7. The user device of claim 5, wherein the input guide is removably coupled to the touch screen.

8. The user device of claim 5, wherein the second physical portions corresponding to the location of the input region boundaries are defined by raised portions compared to the first physical portions corresponding to the location of the input regions.

9. A method of providing a device user interface for visually impaired users and receiving touch-based user input via the interface, the method comprising:
   replacing automatically a default device user interface with the device user interface for visually impaired users;
   presenting via a touch screen of the user device a first menu item comprising menu text, wherein the touch screen is configured to present a touch-input interface for Braille input including a plurality of input regions, each abutting at adjacent input region boundaries and being separated by a centrally-located portal region that is elongated and abuts at least a portion of each input region,
   wherein the plurality of input regions are configured for Braille input and arranged in rows and columns, and
   wherein the centrally-located portal region provides an area for dragging a finger as a buffer for selection of the plurality of input regions, such that the finger maintains contact with the touch screen and passes through the portal region while inputting a Braille character by selecting two or more of the plurality of input regions, and wherein contact is maintained until lifting the finger off the touch screen to trigger output of the Braille character based on the selected two or more of the plurality of input regions;
   presenting via a speaker of the user device a first audio message corresponding to the first menu item text; and
   receiving user touch-input via the touch screen.

10. The method of claim 9, further comprising:
    determining user touch-input calls a new menu item;
    presenting via the touch screen of the user device a second menu item, the second menu item replacing the first menu item, the second menu item comprising second menu text;
    presenting via the speaker of the user device a second audio message corresponding to the second menu item text.

11. The method of claim 9, further comprising:
    determining user touch-input calls an app session;
    suspending the device user interface for visually impaired users;
    reinstating the default device user interface;
    launching the app that was called by the device user input; and
    replacing automatically the default device user interface with the device user interface for visually impaired users when the app session is ended.

12. The method of claim 9, further comprising:
    determining that the received user touch-input calls a Braille keyboard; and
    presenting the plurality of input regions being defined by and separated by input region boundaries.

13. The method of claim 12, wherein the plurality of input regions is configured for six-dot Braille input and comprises six rectangular input regions in a 2×3 arrangement of rows and columns.

14. The method of claim 12, wherein the plurality of input regions is configured for six-dot Braille input and comprises six input regions in a 2×3 arrangement rows and columns.

15. The method of claim 12, wherein the plurality of input regions is configured for six-dot Braille input and comprises six input regions that collectively and completely surround the centrally-located portal region that abuts at least a portion of each input region.

16. The method of claim 12, further comprising:
   receiving touch input selecting one or more of the input regions;
   determining that the touch input selecting one or more of the input regions corresponds to a six-dot Braille character; and
   presenting via the speaker an audio message indicating the six-dot Braille character.

* * * * *